May 14, 1957  R. T. SINEX  2,792,256
SPRINKLER AND CONTROL THEREFOR
Filed April 19, 1954  3 Sheets-Sheet 2
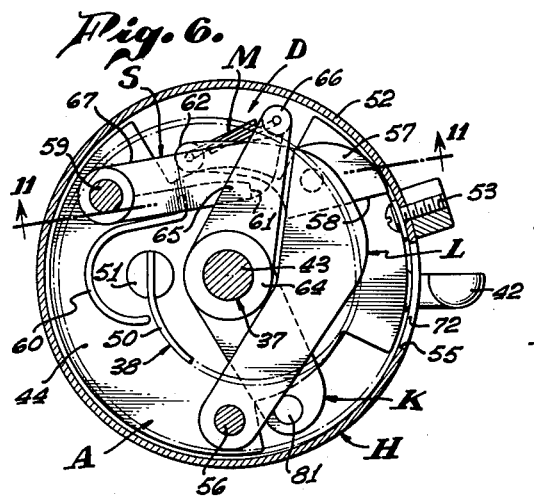
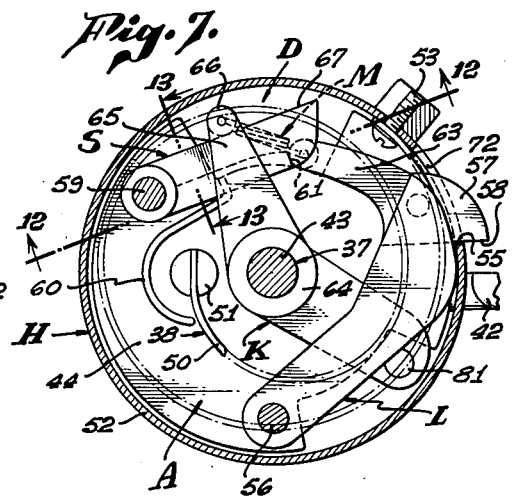
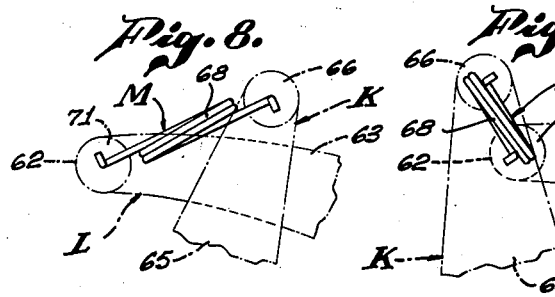
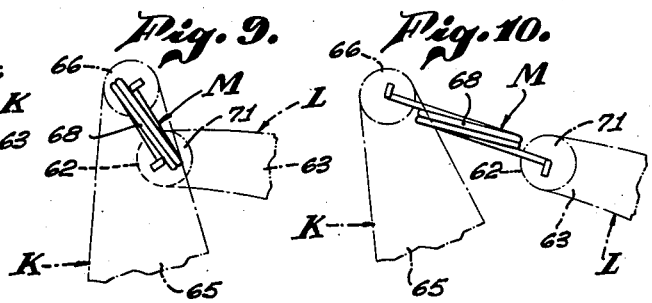
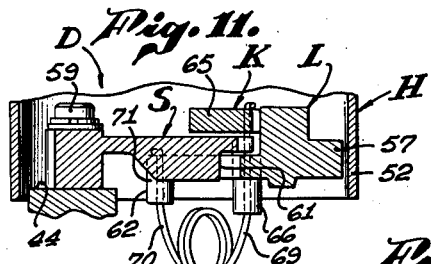
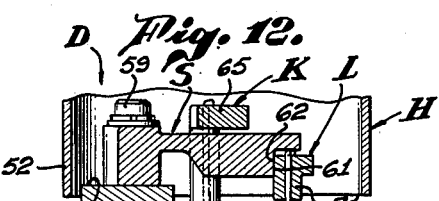
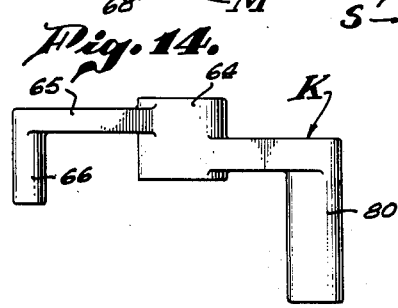
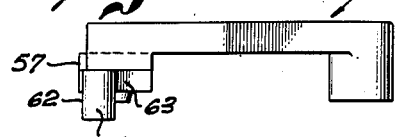
INVENTOR.
REUBEN T. SINEX,
BY
AGENT.

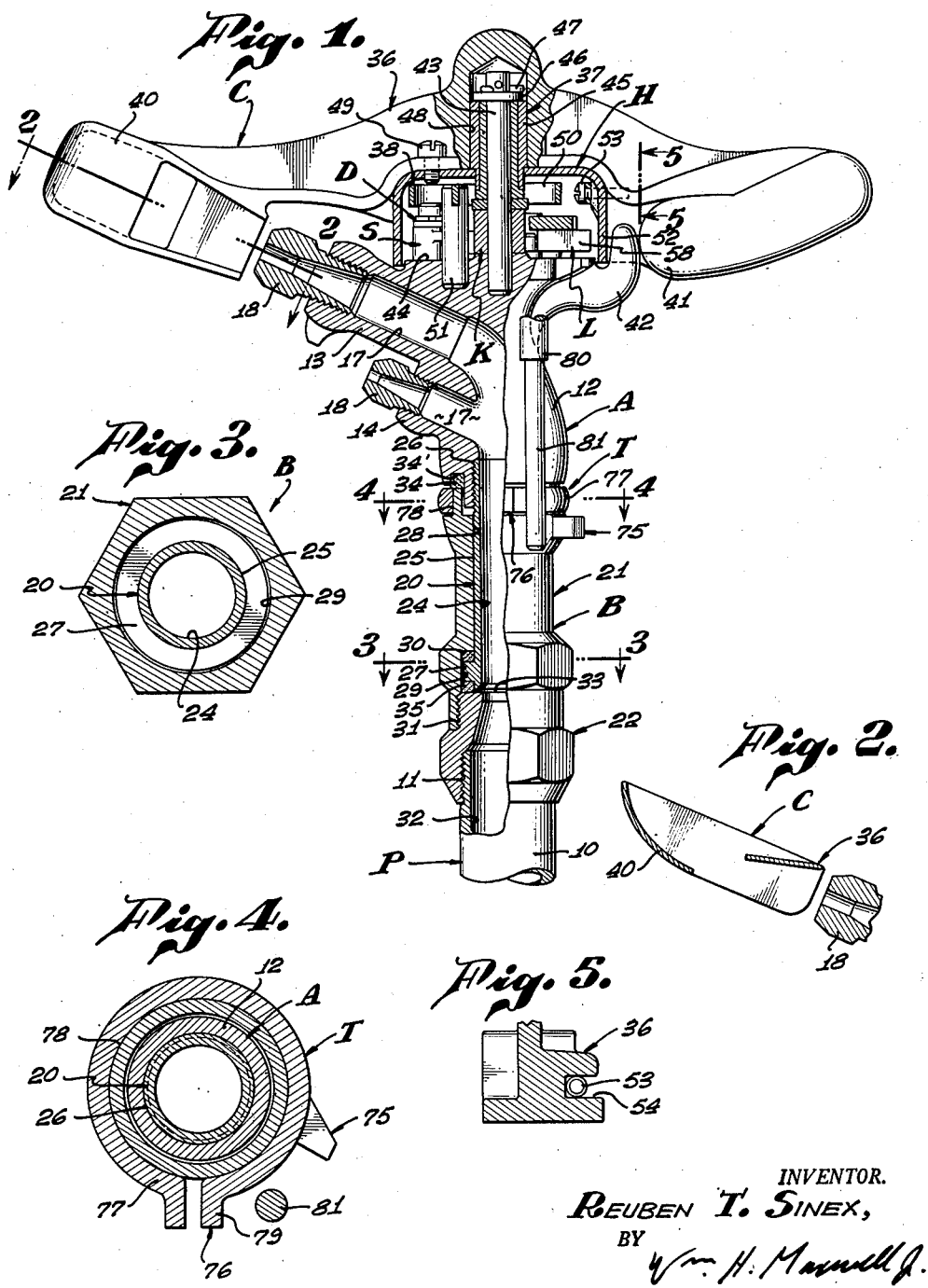
May 14, 1957     R. T. SINEX     2,792,256
SPRINKLER AND CONTROL THEREFOR
Filed April 19, 1954     3 Sheets-Sheet 1
INVENTOR.
REUBEN T. SINEX,
BY
AGENT.

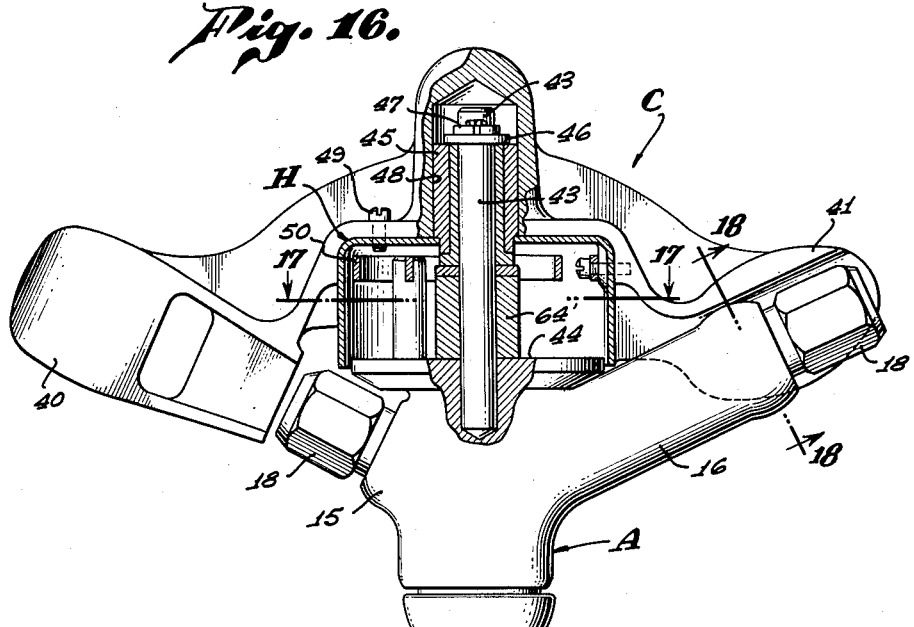
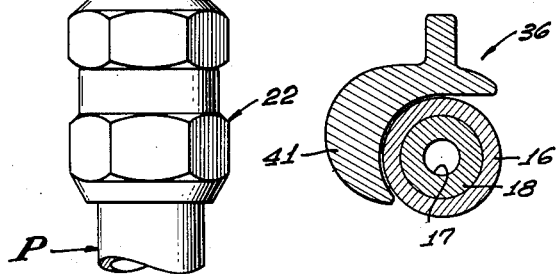
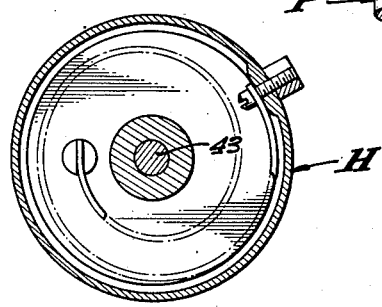

United States Patent Office 2,792,256
Patented May 14, 1957

2,792,256

SPRINKLER AND CONTROL THEREFOR

Reuben T. Sinex, Pasadena, Calif., assignor to Walter V. Storm, doing business as Western Brass Works, Los Angeles, Calif.

Application April 19, 1954, Serial No. 424,229

12 Claims. (Cl. 299—71)

This invention is concerned with a sprinkler for throwing a circular pattern either through a full circle or a part circle, and is particularly concerned with a sprinkler construction that may be provided with a control for limiting the amount of arc through which the sprinkler is to travel. The control which is provided by the present invention is applicable to the sprinkler construction when desired.

It is a general object of this invention to provide a sprinkler construction which is inherently adapted to operate through a full circle and which may be converted by adding a few simple parts so that it is controlled for operation through any part of a circle as circumstances require. When operating as a full circle sprinkler the structure continuously rotates in one direction, whereas when the control is applied thereto the sprinkler oscillates between two set positions.

Another object of this invention is to provide a sprinkler of the character referred to with a simple and effective drive spring which is designed so that there is little or no chance of failure of the spring and so that there is no friction between moving parts in connection with the spring.

It is still another object of this invention to provide a sprinkler construction of the character referred to wherein all of the working parts are completely housed and protected from abuse and from abrasive materials that ordinarily surround such structures when in actual use.

Another object of this invention is to provide a positive quick acting control means for reversing the drive of a sprinkler of the character referred to, which is easily applied to the sprinkler and which is maintained in good working condition with a minimum of care.

It is an object of this invention to provide a sprinkler construction, as above referred to, which involves but few simple inexpensive parts which are easily assembled and which result in a structure which is reliable in operation.

The structure of the present invention is applicable to a riser or to a vertically disposed pipe and involves a body carrying one or more nozzles, which body is rotatably supported by a coupling means at the upper end of the pipe. A drive is provided in connection with the sprinkler and is operable to rotate the sprinkler, both clockwise and counter-clockwise. The drive includes an oscillating arm carried by a pivotal support and a drive spring for operating the arm. Control means is provided which may be applied to the structure when desired to control the operation of the drive and includes a pivoted latch adapted to lock the arm against rotation relative to the body of the sprinkler, a sear adapted to hold the latch in locked engagement with the arm, a control lever adapted to position the latch and release the sear from the latch, and a latch positioning spring adapted to be operated by the control lever and shift the latch. Limiting means is also provided and involves two relatively movable stops. In the preferred form of the invention, one stop is fixed while the other stop is movable, and a bar extending from the control is engageable with the stops so that the control is governed according to the position of the stops.

The various objects and features of my invention will be fully understood from the following detailed description of typical preferred forms and applications of my invention, throughout which description reference is made to the accompanying drawings, in which:

Fig. 1 is an elevational view of the sprinkler that I have provided, showing certain parts thereof in section. Fig. 2 is a sectional view taken as indicated by line 2—2 on Fig. 1. Fig. 3 is a sectional view taken as indicated by line 3—3 on Fig. 1. Fig. 4 is a sectional view taken as indicated by line 4—4 on Fig. 1. Fig. 5 is an enlarged detailed view taken as indicated by line 5—5 on Fig. 1. Fig. 6 is an enlarged detailed sectional view taken as indicated by line 6—6 on Fig. 1, showing the control mechanism in a normal position. Fig. 7 is a view similar to Fig. 6, showing the control mechanism in a locked position. Figs. 8, 9, and 10 show the spring which is provided to shift the latch. Fig. 11 shows the parts of the control in the position in which they occur in Fig. 6. Fig. 12 shows the parts of the control in the position in which they occur in Fig. 7. Fig. 13 is a sectional view taken as indicated by line 13—13 on Fig. 7. Fig. 14 is a view of the control lever which I have provided. Fig. 15 is a view of the latch which I have provided. Fig. 16 is a view similar to Fig. 1, showing a sprinkler of similar design and construction without the control means which I have provided. Fig. 17 is a sectional view taken as indicated by line 17—17 on Fig. 16, and Fig. 18 is a sectional view taken as indicated by line 18—18 on Fig. 16.

The sprinkler of the present invention is applicable to a vertical pipe or standard P, or the like, and involves, generally, a nozzle body A provided with one or more jets or nozzles, a pivotal means B rotatably supporting the body A on the upper end of the pipe P, a drive C adapted to rotate the body A both clockwise and counter-clockwise, a housing H for enclosing the working parts of the structure, a control D adapted to lock the drive so that the normal rotation of the sprinkler is reversed, and limiting means T adapted to govern the action of the control D. The control involves, a latch L, a sear S, a control lever K and a latch positioning spring M.

The pipe P is an elongate vertically disposed tubular element 10 that is threaded at its upper end 11 and conducts and delivers fluid to be handled by the sprinkler.

The nozzle body A is preferably a unitary element cast of suitable metal and includes, an elongate vertically disposed portion 12 concentric with the vertical axis of the element 10, and one or more nozzle portions that project in any suitable manner from the portion 12, it being preferred that the nozzle portions project laterally and somewhat upwardly. As shown in Fig. 1 of the drawings, there may be upper and lower nozzle portions 13 and 14 of different size in order to gain effective and uniform distribution of the fluid handled by the sprinkler. As shown in Fig. 16 of the drawings, the nozzle portions 15 and 16 may be diametrically and oppositely faced. Fluid conducting passages 17 extend through the various portions of the body so that fluid received by the body portion 12 is carried to the various nozzle portions. In practice, suitable nozzles or jets 18 are provided at the terminal ends of the nozzle portions, as shown throughout the drawings.

The pivotal mounting means B, that I have provided, for rotatably securing the body A to the upper end of the pipe P involves, generally, a bearing sleeve 20, a coupling element 21, a retainer 22 and sealing means. The bearing sleeve 20 is a simple elongate vertically disposed tubular part with an inner flow passage 24 and a smooth outer bearing face 25. The upper end of the bearing sleeve 20 is threaded into the lower end of the nozzle body A at 26 and a flange 27 projects radially from the face 25 near the lower end of the sleeve.

The coupling element 21 is also a tubular element and surrounds the sleeve 20 and has a smooth cylindrical inner bore 28 which rotatably receives the bearing face 25 of the sleeve 20. The lower end of the coupling element 21 is counter-bored at 29 to receive a thrust washer 30 which has sliding engagement with the upper face of the flange 27.

The retainer 22 is a nut-like part threadedly engaged with the lower end of the coupling element 21 at 31 and is screw threaded onto the upper end 11 of the pipe P. The retainer 22 has a flow passage 32 extending concentrically therethrough and has a flat upper face 33 normal to the vertical axis of the structure.

The sealing means involves upper and lower sealing rings 34 and 35. The sealing ring 34 is carried in an annular recess 34' formed in the lower end of the nozzle body A and engages a flat upper end face on the coupling element 21. The sealing ring 35 is carried on the bearing face 25 below the flange 27 and engages the flat upper face 33 on the retainer 22. When pressure is applied to the structure of the present invention the nozzle body is lifted relative to the mounting means therefor and the flange 27 bears against the thrust washer 30 while the seals 34 and 35 prevent the fluid handled by the structure from washing through the bearing surfaces and against leaking from the device.

The drive C is adapted to rotate the nozzle body A, both clockwise and counter-clockwise, and involves, generally, an arm 36, a pivotal support 37 for the arm, and a drive spring 38 adapted to yieldingly urge the arm to a normal unactuated position. The arm 36 is adapted to drive in a clockwise direction when it is allowed to oscillate under influence of the flow of fluid and spring 38, and to drive in a counter-clockwise direction when locked relative to the body A by means of the control D hereinafter described.

The arm 36 is pivotally carried at the top of the structure and has a reaction blade 40 operable into the path or stream of fluid which is handled by one of the jets 18. The blade 40 is shaped so that fluid received by the blade is deflected laterally of the normal flow of fluid, with the result that there is a reaction tending to move the arm in a counter-clockwise direction. The arm carries a projection 41 which is formed and adapted to strike against one of the nozzle portions of the body A as shown in Fig. 16 of the drawings, or to strike against a lug 42 projecting from the side of the body A as shown in Fig. 1 of the drawings. When the projection 41 is engaged with a body part as above referred to, the blade 40 is in a position to receive fluid from the jet 18.

The pivotal support 37 involves a simple stud 43 that is concentric with the vertical axis of the structure and which projects upwardly from a flat circular face 44 at the upper end of the body portion 12. A sleeve 45 is retained on the upper end of the stud 43 by means of a washer 46 and a cotter key 47. As shown in the drawings, the sleeve 45 may be bushed. The sleeve 45 is shouldered and carries the downwardly faced cup-shaped housing H, which is adapted to enclose the control mechanism hereinafter described. The arm 36 has a central vertical pilot hole 48 that is slidably received on the sleeve 45 and is held secured to the housing by a suitable screw fastener 49, or the like.

The drive spring 38 is a spirally wound piece or elongate strip 50 of spring material anchored at its inner end to a post 51 that projects upwardly from the face 44 within the housing H. The drive spring 38 is anchored at its outer or live end to an outer peripheral wall 52 on the housing H by means of a suitable screw fastener 53, or the like. In practice, the fastener 53 projects outwardly from the exterior of the wall 52 and is received in a circumferentially disposed notch 54, shown in Fig. 5, in the arm 36 so that the arm must be rotated into keyed engagement with the housing before the fastener 49 is applied.

The control D may or may not be employed with the basic structure above described as circumstances require. If a full circle sprinkler is required no control means is necessary, with a result that the nozzle body will continuously rotate about its vertical axis in a clockwise direction. However, if it is desired to provide a part circle sprinkler the control means hereinafter described is installed within the housing H above referred to. By employing the control D the arm 36 can be locked under control of the limiting means T in a position where the blade 40 is in the jet stream, so that the nozzle body A is rotated in a counter-clockwise direction.

The control D that I have provided involves, generally, a latch L pivotally carried by the body A and engageable with a shoulder 55 in the housing H, a sear or latch lock S pivotally carried by the body A and adapted to hold the latch L in engagement with the shoulder 55, a control lever or bell crank K pivotally carried on the stud 43 and adapted to operate the sear S and to control shifting of the latch L, and a latch positioning spring M cooperating with the control lever to shift the latch L.

The latch L is essentially a simple lever-like part pivoted at one end to a pin 56 projecting upwardly from the face 44. The latch is provided with a head 57 having a locking face 58 engageable with the shoulder 55 in the wall 52 of the housing H. The head 57 is normally carried within the housing H and is shiftable outwardly into engagement with the shoulder 55.

The sear or latch lock S is a simple pivoted element and is located so that it opposes the outer end of the latch L. The sear S is pivotally carried at its inner end by a pin 59 projecting upwardly from the face 44 and is yieldingly urged into engagement with the outer end of the latch L by means of a spring 60. The sear has a lip 61 adapted to engage the outer end 62 of the latch L, which end is extended laterally of the head 57 by means of an extension 63 on the outer end of the latch.

The control lever K is provided with a central hub 64 that properly spaces the sleeve 45 above the face 44 and has an actuating arm 65 that carries a boss 66 at its outer end. In the structure shown in Fig. 16 a suitable space 64' may be provided to properly locate the sleeve 45. The boss 66 is moved by the control lever relative to the sear S and is engageable with a cam face 67 on the sear, so that the sear is operated to be disengaged from the latch L when the lever is turned in a righthand direction as shown in Fig. 6 of the drawings. When the parts are positioned as shown in Fig. 7 of the drawings, the spring 60 moves the sear S into engagement with the end of the latch L.

The latch positioning spring M is characterized by a coiled body portion 68 and two vertically disposed substantially parallel arms 69 and 70. The arms 69 and 70 are normally urged apart by the body portion 68. The arm 69 is pivotally carried by the boss 66 at the outer end of the arm 65, while the arm 70 is pivotally carried by a boss 71 at the outer end of the extension 63 on the latch L. As shown in Fig. 6 of the drawings, the parts of the control are so related that the arm 65 and the extension 63 cross, one overlying the other, with the result that the spring M yieldingly holds them in that position. As shown in Fig. 7 of the drawings, when the arm 65 is moved to the left the ends of the arm and the extension 63 are uncrossed and the spring M acts to yieldingly shift the latch L into locking engagement with the shoulder 55. The action of the spring is clearly indicated in Figs. 8, 9 and 10 of the drawings. In the latter position the sear S is allowed to lock the latch L in locking position. An opening 72 is provided in the wall 52 of housing H, and it will be readily understood that the latch L is yieldingly urged and is shifted into locking position only when the opening 72 registers with the head 57.

The limiting means T involves, generally, a fixed stop 75 and a movable stop 76. The fixed stop 75 is positioned to provide a starting point for the sprinkler and involves a simple lug that projects radially from the coupling element 21. The movable stop 76 is positioned as desired to determine the amount of arc through which the sprinkler is to oscillate, and involves a spring-like collar 77 carried in an annular channel 78 in the coupling element 21. A lug 79 projects radially from the collar 77. A control arm 80 projects from the control lever K and carries a control bar 81 which depends from the arm to operate between the two stops 75 and 76. When the bar 81 engages the stops the control lever K is rotated thereby operating the sear S and the spring M to shift the latch L.

From the foregoing it will be apparent that I have provided a simple economical sprinkler construction which may be used either as a full circle sprinkler or a part circle sprinkler as circumstances require. When it is desired to operate the sprinkler through a given arc the control means as above described is applied to the structure so that the sprinkler oscilates within predetermined limits. The moving parts are few and simple and they are completely housed so that they cannot be tampered with and are not subject to becoming fouled or clogged with foreign material, such as mud or the like.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, and a control for the drive including, a latch pivotally carried by the body and within the housing and engageable with a shoulder on the housing, a sear pivotally carried by the body and within the housing and adapted to hold the latch engaged with the shoulder, and a control lever pivotally carried by the body and within the housing and adapted to operate the sear and shift the latch.

2. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, and a control for the drive including, a latch pivotally carried by the body and within the housing and engageable with a shoulder on the housing, a sear pivotally carried by the body and within the housing and adapted to hold the latch engaged with the shoulder, a latch positioning spring, and a control lever pivotally carried by the body and within the housing and adapted to operate the sear and to move the spring to shift the latch.

3. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, a control for the drive including, a latch pivotally carried by the body and within the housing and engageable with a shoulder on the housing, a sear pivotally carried by the body and adapted to hold the latch engaged with the shoulder, a latch positioning spring, and a control lever pivotally carried by the body and within the housing and adapted to operate the sear and to move the spring to shift the latch, and a limiting means including, relatively movable stops and a controlling bar carried by the said lever and engageable with the stops.

4. A sprinkler of the character described including, a vertically disposed nozzle body with a laterally disposed jet, a pivotal mounting means for the body, a drive for rotating the body including, a stud projecting upwardly from the body, a sleeve retained on the stud and carrying a housing, and an arm with a circumferentially disposed notch keyed with a part projecting from the housing and releasably secured to and carried by the housing and having a reaction blade operable into and out of alignment with the jet, and a control for the drive enclosed within the housing and including, a latch pivotally carried by the body and engageable with a shoulder on the housing, a sear pivotally carried by the body and adapted to hold the latch engaged with the shoulder, and a control lever pivotally carried by the body and adapted to operate the sear and shift the latch.

5. A sprinkler of the character described including, a vertically disposed nozzle body with a laterally disposed jet, a pivotal mounting means for the body, a drive for rotating the body including, a stud projecting upwardly from the body, a sleeve retained on the stud and carrying a housing, and an arm with a circumferentially disposed notch keyed with a part projecting from the housing and releasably secured to and carried by the housing and having a reaction blade operable into and out of alignment with the jet, and a control for the drive enclosed within the housing and including, a latch pivotally carried by the body and engageable with a shoulder on the housing, a sear pivotally carried by the body and adapted to hold the latch engaged with the shoulder, a latch positioning spring, and a control lever pivotally carried by the body and adapted to operate the sear and to move the spring to shift the latch.

6. A sprinkler of the character described including, a vertically disposed nozzle body with a laterally disposed jet, a pivotal mounting means for the body, a drive for rotating the body including, a stud projecting upwardly from the body, a sleeve retained on the stud and carrying a housing, and an arm with a circumferentially disposed notch keyed with a part projecting from the housing and releasably secured to and carried by the housing and having a reaction blade operable into and out of alignment with the jet, a control for the drive enclosed within the housing and including, a latch pivotally carried by the body and engageable with a shoulder on the housing, a sear pivotally carried by the body and adapted to hold the latch engaged with the shoulder, a latch positioning spring, and a control lever pivotally carried by the body and adapted to operate the sear and to move the spring to shift the latch, and a limiting means including relatively movable stops and a controlling bar carried by the said lever and engageable with the stops.

7. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, and a control for the drive including, a latch pivotally carried on a pin projecting vertically from the body and engageable with a shoulder on the housing, a sear pivotally carried on a pin projecting vertically from the body and being opposed to the latch to hold the latch engaged with the shoulder, and a control lever pivotally carried on a stud projecting vertically from the body and adapted to operate the sear and shift the latch.

8. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, and a control for the drive including, a latch pivotally carried on a pin projecting vertically from the body and having a head engageable with a shoulder on the housing, a sear pivotally carried on a pin projecting vertically from the body and having a lip opposed to the latch to hold the latch engaged with the shoulder, a latch positioning spring and a control lever pivotally carried on a stud projecting vertically from the body and adapted to operate the sear and to move the spring to shift the latch.

9. A sprinkler of the character described including, a vertically disposed nozzle body with a housing at the upper end thereof and with a laterally disposed jet, a pivotal mounting means for the body, a drive for rotating the body including, an arm rotatably carried by the housing and having a reaction blade operable into and out of alignment with the jet, a control for the driving including, a latch pivotally carried on a pin projecting vertically from the body and having a head engageable with a shoulder on the housing, a sear pivotally carried on a pin projecting vertically from the body and having a lip opposed to the latch to hold the latch engaged with the shoulder, a latch positioning spring, and a control lever pivotally carried on a stud projecting vertically from the body and adapted to operate the sear and to move the spring to shift the latch, and a limiting means including relatively movable stops and a controlling bar carried by the said lever and engageable with the stops.

10. A sprinkler of the character described including, a vertically disposed nozzle body with a laterally disposed jet, a pivotal mounting means for the body, a drive for rotating the body including, a stud projecting vertically from the body, a sleeve retained on the stud and carrying a housing, and an arm releasably secured to and carried by the housing and having a reaction blade operable into and out of alignment with the jet, and a control for the drive enclosed within the housing and including, a latch pivotally carried on a pin projecting vertically from the body and engageable with a shoulder on the housing, a sear pivotally carried on a pin projecting vertically from the body and being opposed to the latch to hold the latch engageable with the shoulder, and a control lever pivotally carried on the vertical stud and adapted to operate the sear and shift the latch.

11. A sprinkler of the character described including a vertically disposed nozzle body with a laterally disposed jet, a pivotal mounting means for the body, a drive for rotating the body including, a stud projecting vertically from the body, a sleeve retained on the stud and carrying a housing, and an arm releasably secured to and carried by the housing and having a reaction blade operable into and out of alignment with the jet, and a control for the drive enclosed within the housing and including, a latch pivotally carried on a pin projecting vertically from the body and having a head engageable with a shoulder on the housing, a sear pivotally carried on a pin projecting vertically from the body and having a lip opposed to the latch to hold the latch engaged with the shoulder, a latch positioning spring, and a control lever pivotally carried on the vertical stud and adapted to operate the sear and to move the spring to shift the latch.

12. A sprinkler of the character described including, a vertically disposed nozzle body with a laterally disposed jet, a pivotal mounting means for the body, a drive for rotating the body including, a stud projecting vertically from the body, a sleeve retained on the stud and carrying a housing, and an arm releasably secured to and carried by the housing and having a reaction blade operable into and out of alignment with the jet, a control for the drive enclosed within the housing and including, a latch pivotally carried on a pin projecting vertically from the body and having a head engageable with a shoulder on the housing, a sear pivotally carried on a pin projecting vertically from the body and having a lip opposed to the latch to hold the latch engaged with the shoulder, a latch positioning spring, and a control lever pivotally carried on the vertical stud and adapted to operate the sear and to move the spring to shift the latch, and a limiting means including relatively movable stops and a controlling bar carried by the said lever and engageable with the stop.

References Cited in the file of this patent
UNITED STATES PATENTS

| Number | Name | Date |
|---|---|---|
| 1,997,901 | Englehart | Apr. 16, 1935 |
| 2,226,028 | Strawn | Dec. 24, 1940 |
| 2,228,720 | Coles | Jan. 14, 1941 |
| 2,254,270 | Coles | Sept. 2, 1941 |
| 2,256,737 | Englehart | Sept. 23, 1941 |
| 2,309,782 | Orr | Feb. 2, 1943 |
| 2,345,030 | Buckner | Mar. 28, 1944 |